United States Patent [19]

Corey et al.

[11] Patent Number: 4,593,608

[45] Date of Patent: Jun. 10, 1986

[54] LIGHTWEIGHT PISTON-ROD ASSEMBLY FOR A RECIPROCATING MACHINE

[75] Inventors: John A. Corey, North Troy; Michael M. Walsh, Schenectady, both of N.Y.

[73] Assignee: Mechanical Technology Incorporated, Latham, N.Y.

[21] Appl. No.: 605,782

[22] Filed: May 1, 1984

[51] Int. Cl.$^4$ ............................................. F01B 31/08
[52] U.S. Cl. ............................................. 92/176; 92/187
[58] Field of Search ................ 92/140, 176, 187, 231, 92/260, 188–191; 308/3 CH; 60/525, 517; 123/197 AB

[56] References Cited

U.S. PATENT DOCUMENTS

| | | | |
|---|---|---|---|
| 1,409,309 | 3/1922 | Nordberg | 92/176 |
| 1,753,925 | 4/1930 | Gorr | 308/3 CH |
| 1,788,558 | 1/1931 | Baum | 60/525 |
| 1,879,563 | 9/1932 | Smith | 60/525 |
| 2,463,174 | 3/1949 | Hasselberg | 92/140 |
| 3,596,570 | 8/1971 | Kenyon | 92/260 X |
| 4,107,925 | 8/1978 | Watson | 60/525 X |
| 4,417,444 | 11/1983 | Lundholm | 60/525 |
| 4,487,020 | 12/1984 | Dineen | 60/525 |

Primary Examiner—Edward K. Look
Attorney, Agent, or Firm—Joseph V. Claeys

[57] ABSTRACT

In a reciprocating machine, there is provided a hollow piston including a dome portion on one end and a base portion on the opposite end. The base portion includes a central bore into which a rod is hermetically fixed in radial and angular alignment. The extending end of the rod has a reduced diameter portion adapted to fit into the central bore of a second member such as a crosshead assembly, and to be secured thereto in radial and axial alignment with the piston.

3 Claims, 4 Drawing Figures

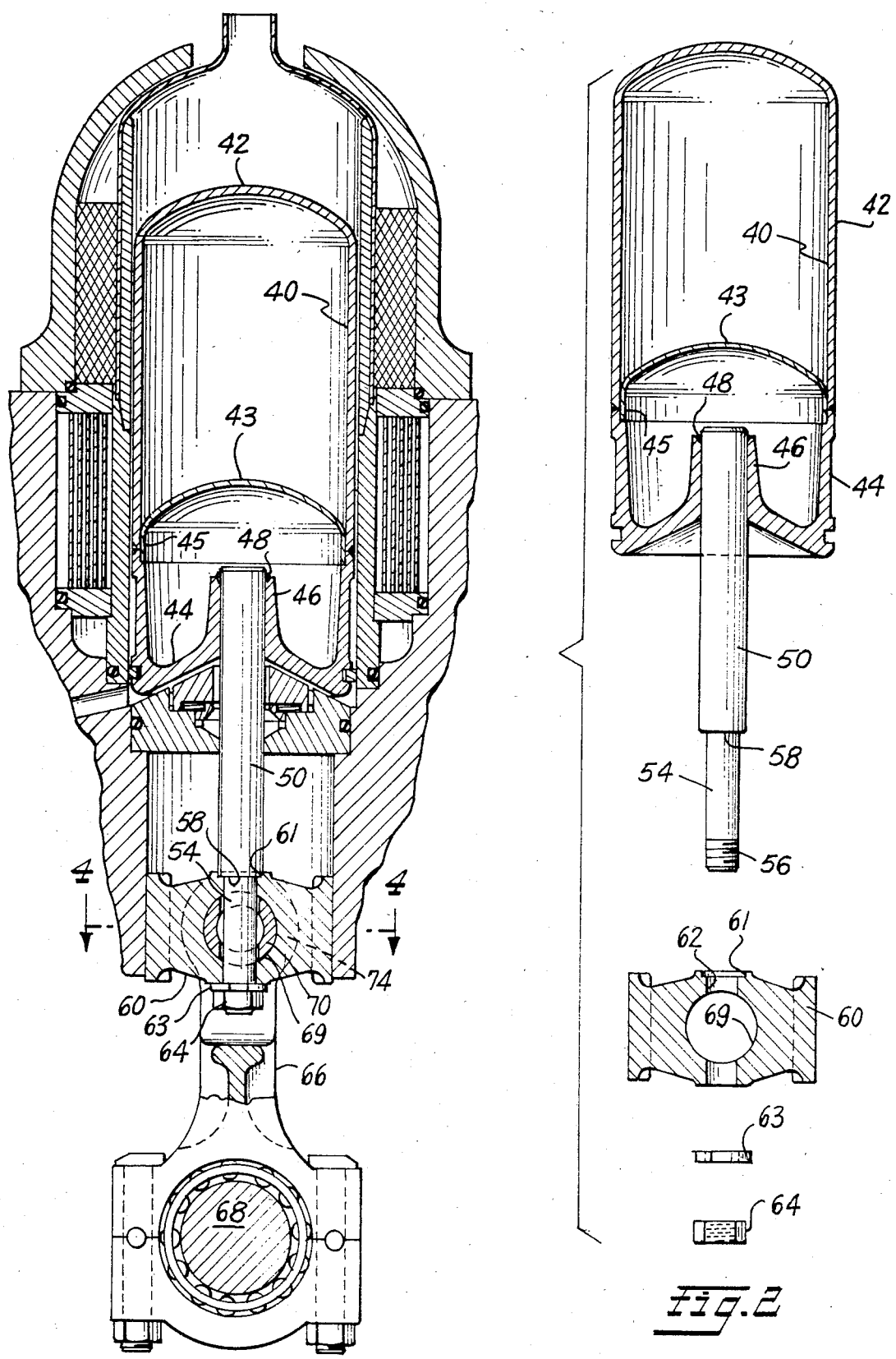

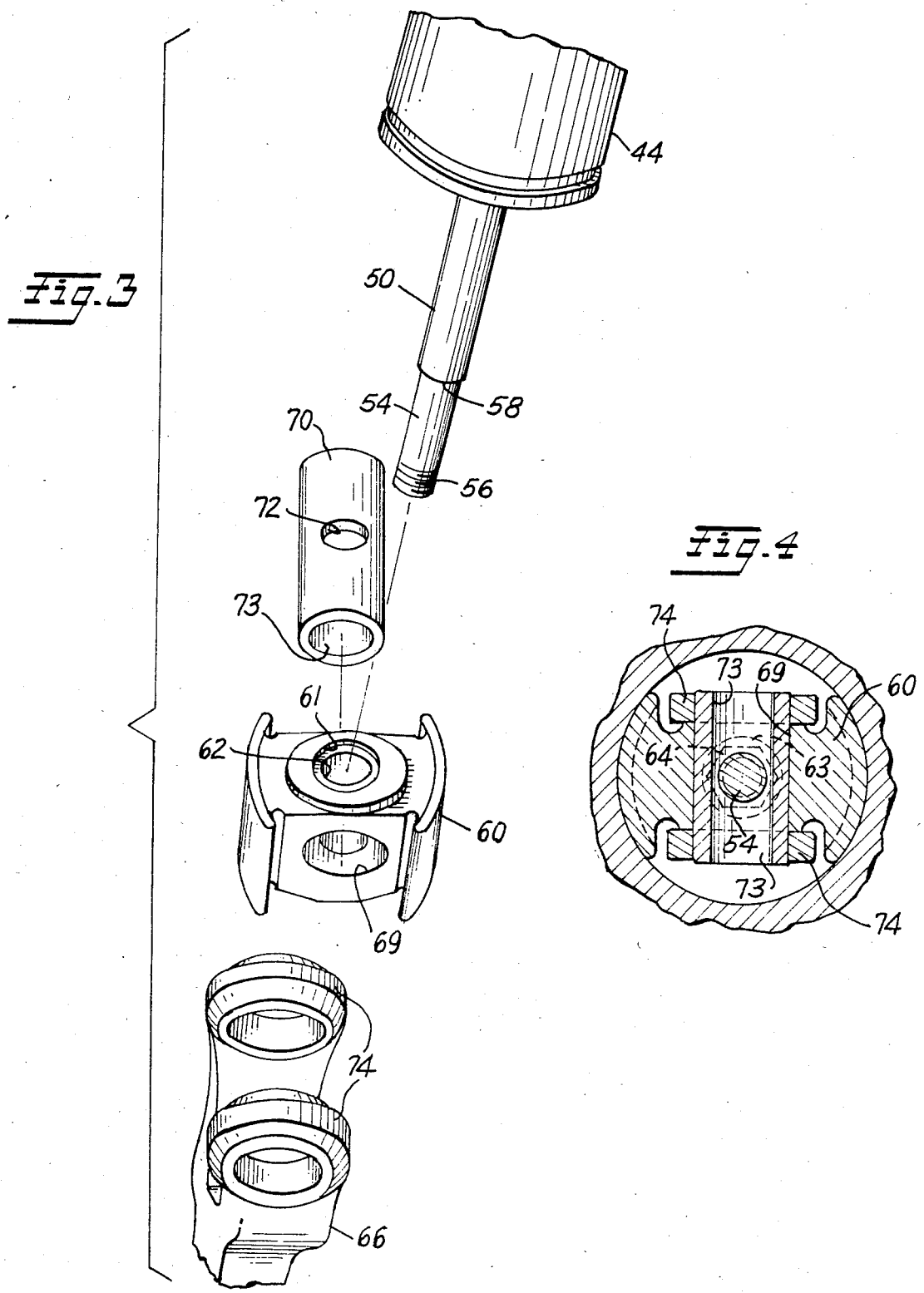

LIGHTWEIGHT PISTON-ROD ASSEMBLY FOR A RECIPROCATING MACHINE

The Government of the United States of America has rights in this invention pursuant to Contract DEN3-32 awarded by the United States Department of Energy.

FIELD OF THE INVENTION

This invention relates to a novel lightweight piston-rod assembly for a reciprocating machine.

BACKGROUND PRIOR ART

Known domed piston/piston-rod assemblies such as those used in reciprocating hot gas engines utilize a unitary piston-rod/crosshead member assembled to a multi-member piston assembly including a base and a dome. A tapered portion of the piston-rod/crosshead is frictionally retained in a tapered joint in the base member of a piston assembly and a locking nut further secures the rod to the base. The dome is then attached to the base, usually by a threaded attachment. A detachable dome element is necessary to allow access to the locking nut.

Controlled radial and axial clearances are critical for good performance in all reciprocating machinery. In hot gas engines, the concentricity or radial alignment of the piston and piston-rod determines the wear and leakage of the seal elements required between the working fluid in the cylinders and the lubricant in the crankcase. Leakage reduces engine performance. The angular alignment of the piston and rod can cause a radial displacement of the piston top from its ideal position. This is significant in a hot gas engine due to the required dome length. To avoid rubbing contact between a poorly aligned piston dome and cylinder, a larger gap clearance is required, which reduces engine performance.

In operation, the combination of tapered and threaded joints of known assemblies results in poor tolerance control. The tapered joint is intended to provide good angular and concentric alignment between the rod and the piston. However, it creates poorly defined axial length. The threaded attachment of the dome results in poor angular and concentric alignment and so nullifies the good radial alignment of the tapered joint. Furthermore, the assembly is needlessly heavy due to the multiple joints, complicating engine balance. Additionally, working fluid may leak into the two piece piston assembly since it is difficult to obtain a perfect seal at the threaded attachment of the dome and base.

SUMMARY OF THE INVENTION

An object of this invention is to provide a piston-rod assembly for a reciprocating machine which provides for improvement in axial, radial and concentric tolerance control and which reduces the cost of fabrication, reduces the weight of the assembly, provides easier assembly of the piston-rod unit and obviates leakage problems.

Briefly stated, in accordance with one aspect of the invention, there is provided a hollow piston including a dome portion on one end and a base portion on the opposite end. The base portion includes a central bore into which a rod is hermetically fixed in radial and angular alignment. The extending end of the rod has a reduced diameter portion adapted to fit into the central bore of a second member such as a crosshead assembly, and to be secured thereto in radial and axial alignment with the piston.

DESCRIPTION OF THE DRAWINGS

FIG. 1 is a sectional view of one embodiment of a lightweight piston assembly according with the present invention;

FIG. 2 is an exploded view of the structure of FIG. 1;

FIG. 3 is an exploded view of a crosshead assembly mounted on the piston-rod of the present invention; and FIG. 4 is a section taken along line 4—4 of FIG. 1.

DETAILED DESCRIPTION OF PRIOR ART

A known type of piston-rod assembly used in hot gas reciprocating engines is shown in U.S. Pat. No. 4,417,444. The assembly includes a base member shown generally at 4 and adapted to be secured to a piston dome 5 by screw threads (not shown) provided on base member 4 and dome 5 respectively. The assembly also includes a rod 6 having near one end thereof a tapered section which terminates in a threaded region. The tapered section is press-fitted into a tapered hole in the base member and is further secured to base member 4 by a washer and lock nut.

The other end of the rod 6 terminates in a integrally formed crosshead element (not shown). The crosshead element is adapted to be pivotally attached to a connecting rod and crankshaft in known manner.

The required tolerances between the base member 4, rod 6 and piston dome 5 are difficult to control due to the number and type of joints and the overall assembly length. The tapered joint was used in an attempt to assure good concentricity and angular alignment between the rod 6 and the base member 4. The tapered joint between base member 4 and rod 6 requires additional axial length and results in poor determination of the axial length of the assembly. Furthermore, there is a tendency for some radial and angular misalignment. The present invention obviates the foregoing and other problems and provides for a new and improved lightweight piston and rod assembly.

DETAILED DESCRIPTION OF PREFERRED EMBODIMENT

In FIG. 1 there is shown one embodiment of the invention incorporated in a Stirling-type hot gas engine, wherein the piston and piston-rod is fabricated as one unit. One simple connecting joint connects the piston and piston-rod unit to a crosshead assembly. As shown, the invention comprises a hollow cylindrical piston 40 which is open at one end and terminates at the other end in a dome or head 42. A cup-shaped base member 44 is sealingly secured to the open end of piston 40, such as by welding or any other suitable means which securely and hermetically seals the hollow cylindrical piston 40 to the base member 44. Base member 44 may be provided with an internal annular recess 45. An internal radiation shield and support 43 fits in the recess. The cylindrical portion of support 43 serves to align the base member 44 and piston 40. Base member 44 is also provided with an upwardly directed central boss 46 into which a central bore 48 is formed. A rod 50 has one end 52 closely fitted within the central bore 48 and is welded or otherwise sealingly secured thereto in radial and angular alignment with the longitudinal axis of piston 40 and also provides for a secure, hermetic fastening and seal to the base member 44. The foregoing insures radial and angular alignment of the piston and rod which is critical to hot gas engine performance.

As shown more clearly in FIG. 2, the other end of rod 50 is provided with a reduced diameter portion 54 which terminates at one end in threads 56 and at the other end at a shoulder 58. Reduced diameter rod end portion 54 can be readily passed through any required seal elements while full rod portion 50 insures a close fit.

A second reciprocating member, such as a crosshead assembly 60 that takes up the side loads, has a pilot bore 61 and a smaller through bore 62 coaxial with the longitudinal axis of the piston-rod. The full diameter portion of rod 50 fits securely in pilot bore 61 and provides radial alignment. The reduced diameter portion 54 of the piston-rod 50 fits loosely into the through bore 62 of the crosshead assembly 60. The face of shoulder 58 abuts the bottom of the pilot bore 61 and axially locates the piston assembly to the crosshead assembly. The squareness of the shoulder 58 on the rod abutting against the bottom of the pilot bore angularly locates the two parts. The smaller axial length of the crosshead is less sensitive to angular misalignment than the much larger piston assembly. The crosshead assembly 60 may be secured by a separate washer 63 and nut 64 or by a similar internally-threaded means which may be provided in the crosshead assembly 60. The foregoing assures radial and angular alignment between piston and crosshead assemblies.

As shown more clearly in FIG. 3, crosshead assembly 60 may be connected to a connecting rod 66 which is adapted for connection to a crankshaft, shown at 68 in FIG. 1. A bore 69 transverse to the through bore 62 is provided in the crosshead assembly 60 into which fits a cylindrical wrist pin 70. Wrist pin 70 has a bore 72 through its body that is coincident and coaxial with the axial bore 62 of crosshead assembly 60 when pin 70 is positioned in bore 69. The reduced diameter portion 54 of the piston-rod 50 passes through the bore 62 of crosshead assembly 60 and through the bore 72 of the wrist pin 70 and is secured by the nut 64 or similar means. As seen in FIG. 4, the crosshead assembly 60 is constructed such that the protruding ends 73 of the wrist pin 70 can be connected with the bifurcated end 74 of connecting rod 66 to allow for pivotal motion of the connecting rod.

By permanently joining the piston dome, piston base, and piston-rod into a single, sealed unit, all prior art sealing problems are completely obviated. This integrally constructed piston and rod assembly allows final machining of the piston and dome to be made relative to the piston-rod centerline, guaranteeing very good radial and angular alignment of the rod and piston which are critical tolerances that determine engine performance. Separation of the piston-rod and crosshead allows for better manufacturing of each. The piston-rod can be readily made from stock shaft material. The crosshead is small and may be a simple casting. Such an arrangement is less expensive and provides better tolerances than known constructions. Use of a shoulder on the piston-rod and pilot bore in the crosshead more precisely aligns the rod and crosshead and eliminates large axial length variations created by the prior art tapered joint. Exactly locating the piston to the crosshead allows reduced running clearances without rubbing or axial contact at the ends of the piston stroke, which in turn minimizes the dead volume in the cylinders and thus improves engine performance.

The novel structure of this invention provides a lighter weight assembly with lower cost and easier assembly. Elimination of the tapered rod/base joint and the threaded base/dome joint in favor of a single fastening such as a nut between the rod and crosshead or a threaded hole in the crosshead reduces the reciprocating mass substantially. This in turn reduces loads on the bearings, the requirement for balance mass and the vibration of the rod assembly. Finally the cost of assembly is reduced since there is less stringent tolerance control on the parts for a given running clearance, simplier joints without tapers or O-rings and overall fewer parts.

It is to be understood, of course, that the embodiment of the invention set forth herein is described in detail in order to present a full and clear description and that the invention is not limited to the details of the embodiment presented. Accordingly, many modifications and changes may readily occur to those skilled in the art. The appended claims therefore, are intended to cover all such modifications and changes as fall within the true spirit and scope of the invention.

Having thus described the invention in detail, what is claimed is:

1. In a hot gas engine, a piston-rod assembly adapted for connecting a reciprocating piston in a cylinder with a crosshead member adapted to be connected through a pivotable connecting rod to the engine crankshaft, the improvement comprising:
    (a) a hollow, piston terminating at one end in a closed head portion and at the opposite end in a base portion of generally cup shape with an upwardly extending center portion having a central bore therein;
    (b) a rod having a first end adapted to be disposed in the central bore of said base portion of said piston and a second end having a reduced diameter portion extending axially away from said first end and terminating at one end in a shoulder;
    (c) means securing said first end of said rod in the central bore of said base portion of said piston to provide an integral, fluid-tight, radially and angularly aligned piston-rod assembly;
    (d) said crosshead member having an axial bore coaxial with the line of reciprocation of said piston, a pilot bore at a first end of the crosshead member and said axial bore, and a transverse bore perpendicular to said axial bore;
    (e) a cylindrical wrist pin having a transverse bore and adapted to be closely fitted wihin the transverse bore of said crosshead member with the transverse bore of the wrist pin aligned with the axial bore of said crosshead member to provide a crosshead member-wrist pin assembly for closely receiving the reduced diameter portion of said rod; and
    (f) means for securing said rod to said crosshead member-wrist pin assembly with a full diameter portion of said rod closely fitted within said pilot bore and with said shoulder abutting the bottom of the pilot bore at the first end of said crosshead member.

2. The piston-rod assembly recited in claim 1, wherein the other end of the reduced diameter portion of said rod terminates in threads and said means for securing said rod to said crosshead member-wrist pin assembly includes a nut threaded onto said threaded other end.

3. The piston-rod assembly recited in claim 1, wherein the other end of said reduced diameter portion of said rod terminates in threads and said means for securing said rod to said crosshead member-wrist pin assembly includes an internally threaded section on the extreme end of the axial bore of said crosshead member.

* * * * *